(No Model.) 2 Sheets—Sheet 1.

F. ARMBRUST.
MACHINE FOR BEVELING GLASS.

No. 380,737. Patented Apr. 10, 1888.

Witnesses.

Inventor:
Ferdinand Armbrust.

(No Model.) 2 Sheets—Sheet 2.

F. ARMBRUST.
MACHINE FOR BEVELING GLASS.

No. 380,737. Patented Apr. 10, 1888.

WITNESSES.
Henry Strodthoff.
A. B. Caldwell.

INVENTOR.
Ferdinand Armbrust.
Per Aloha Vivartta, his Atty.

UNITED STATES PATENT OFFICE.

FERDINAND ARMBRUST, OF NEW YORK, N. Y.

MACHINE FOR BEVELING GLASS.

SPECIFICATION forming part of Letters Patent No. 380,737, dated April 10, 1888.

Application filed May 26, 1887. Serial No. 239,504. (No model.)

*To all whom it may concern:*

Be it known that I, FERDINAND ARMBRUST, a citizen of the United States, and a resident of New York, in the county of New York and State of New York, have invented certain new and useful Improvements in Machines for Beveling Glass, of which the following is a specification.

The object of my invention is to produce a means of grinding and beveling the edges of glass plates, however large the same may be, with more facility and safety in handling the same and with machinery less expensive to construct and operate than has been done hitherto.

Figure 1:
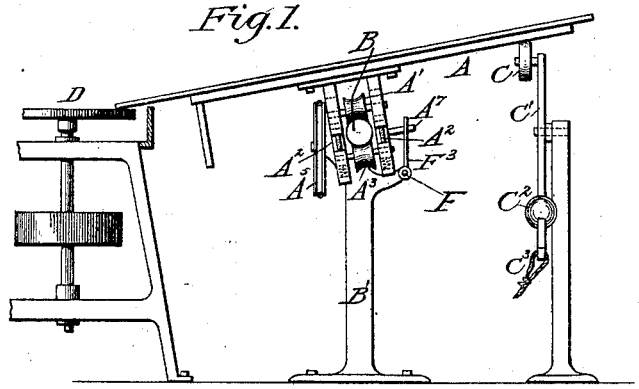
Figure 2:
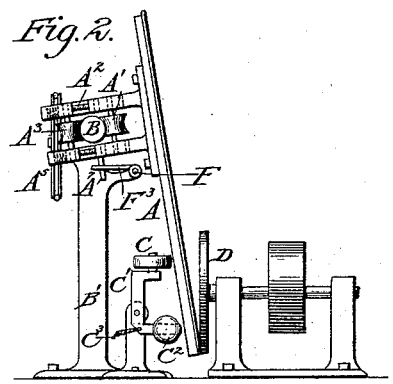
Figure 3:
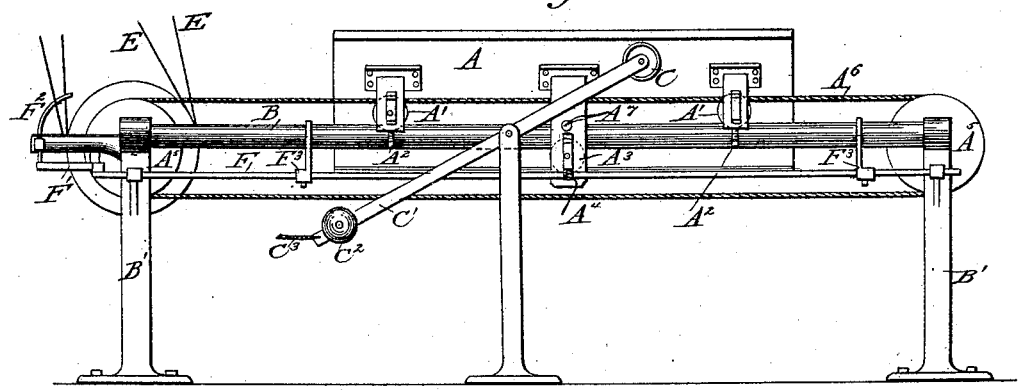
Figure 4:
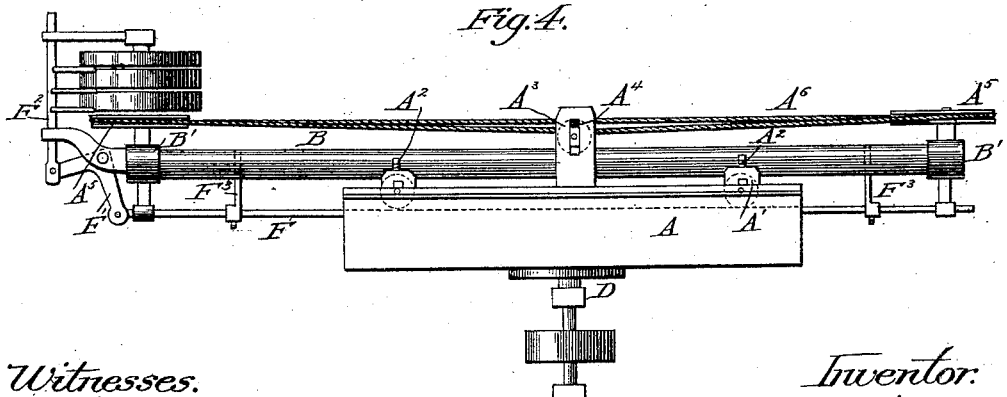
Figure 5:
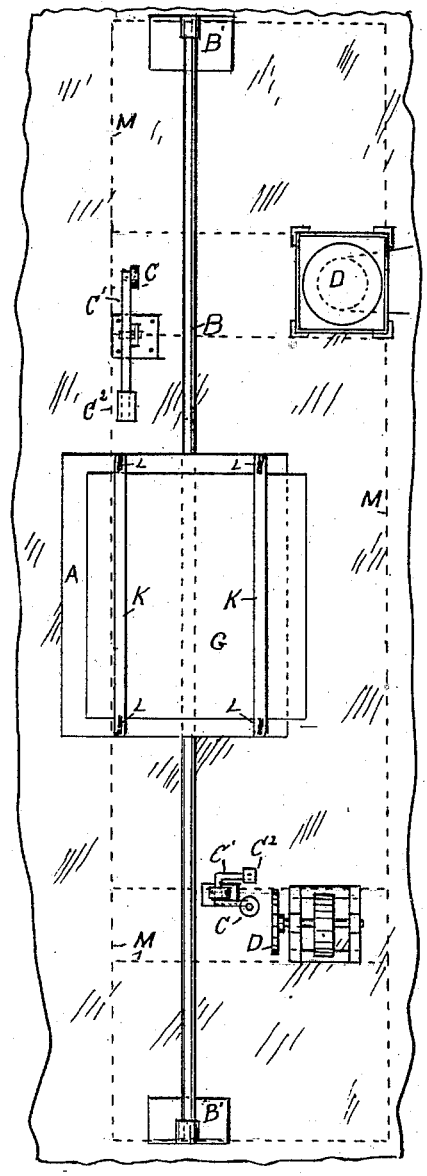
Figure 6:
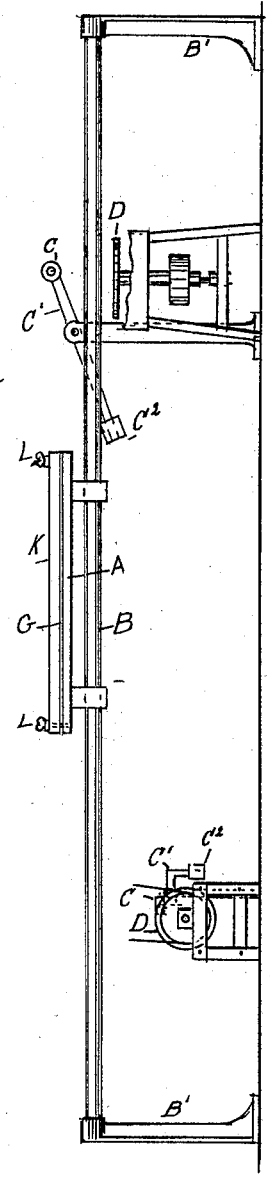

Figure 1 is an end view of my machine as grinding the lower side of a plate. Fig. 2 is an end view of my machine as grinding the upper side of a plate. Fig. 3 is a side elevation of Fig. 1. Fig. 4 is a plan view of Fig. 2. Fig. 5 is a general plan view showing the arrangement of my machine as fitted for grinding both sides of the glass. Fig. 6 is an elevation of Fig. 5.

The same letters refer to the same parts throughout.

My invention consists of a table for carrying the glass which is to be ground or beveled, which is so mounted upon a cylindrical rail upon which it travels to and fro that it may be swung to any position as required by the nature of the work, and while in such position travel along the said rail, carrying the glass by the grinding mechanism or mill with the proper pressure thereon; also, it is to be remarked that in handling large plates of glass, as formerly done, where the tables are level, or nearly so, it requires several men and much labor and care to place a plate upon such level table without breaking the glass or losing much time. This I obviate by throwing my table into the position shown in Fig. 2, when two men, bringing the plate of glass in the usual manner on its edge or in a vertical position, stand it by the side of the table, and gently leaning it against the same simply hold it there and throw the table up level, or in the position shown in Fig. 1, without extra help, loss of time, or risk of breakage.

In my machine the table A is mounted upon trucks A', which are provided with slotted bearings and adjusting-screws $A^2$, by means of which the table A may be thrown farther from or nearer to the center of the rail B. The trucks A' have faces made to fit the circular rail B, upon which they travel. Another truck, $A^3$, is secured to the table A by slotted bearings adjusted by means of a spring, $A^4$, or screws may be used, if preferred. The truck $A^3$ is so placed as to run on the opposite side of B from A', and by that means bind or retain the table A in its relation to B, no matter at what angle it may be set. A roll, C, is provided under the other part of the table, which, being carried by the lever C', governed by the adjustable weight $C^2$, keeps the proper pressure of the glass against the grinding-face of the mill D. When the grinding has progressed far enough, the operative by pulling the cord $C^3$ lifts the weight $C^2$ and the glass at once, and the grinding ceases.

The mill for grinding the under surface of the glass is set upon a vertical shaft in the usual manner, as shown in Fig. 1. The mill for grinding the upper surface of the glass is set upon a horizontal shaft in the usual manner, as shown in Fig. 2. Glass has been ground in both of these positions, but not by one and the same machine; wherefore when both surfaces of a plate are to be beveled the plate must be transferred from one machine to another, or else turned over, either operation involving much loss of time, labor, and risk of breakage, while in my machine such change is simply a change of position of the table, as from that shown in Fig. 1 to that shown in Fig. 2, made in little time without extra help or risk.

The rail B is supported by standards B' at the two ends, leaving the major portion clear for the free movement of the table A. The standards B' also carry the journals of the pulleys $A^5$, upon which runs a rope or belt, $A^6$, which, being secured to the table A, serves to draw or feed it along. The pulleys $A^5$ are driven by a belt, E, running on fast and loose pulleys in the usual manner. A rod, F, fitted to slide in brackets or bearings secured to the standards B' by means of the lever F', connected to a shipper, $F^2$, governs the driving-belt. The rod F is provided with adjustable dogs $F^3$, which are so placed as to be struck by the projection $A^7$, provided upon the table A. By this means the table A will at the proper place automatically shift the belt from one pulley to the other and the movement of the table A will be reversed.

For the purpose of securing the glass upon the table the ordinary arrangement of clamps K and screws L may be used. When the floor of the grinding-room is level and strong, the standards of the different parts of the machine may be simply bolted thereto; but in many cases an especial frame (indicated by the dotted line M) will be found an advantage, as preserving relative position of the parts.

Having thus described the nature and uses of my invention, I claim—

1. In a glass-beveling machine, the combination of the table A, having the adjustable trucks A', with adjusting-screws $A^2$, and binding-truck $A^3$, with spring-bearing $A^4$, and the rail B, and mill D, constructed and operated as and for the purposes herein shown and set forth.

2. In a glass-beveling machine, the combination of the table A, having the adjustable trucks A', binding-truck $A^3$, and rail B, with the bearing-roll C, lever C', and adjustable weight $C^2$, constructed and operated substantially as and for the purposes herein shown and set forth.

Signed at New York, in the county of New York and State of New York, this 25th day of May, A. D. 1887.

FERD. ARMBRUST.

Witnesses:
 WM. H. HASTINGS,
 ALOHA VIVARTTAS.